United States Patent [19]
Karlsson

[11] Patent Number: 6,142,582
[45] Date of Patent: Nov. 7, 2000

[54] HYDRAULIC VEHICLE BRAKE SYSTEM

[75] Inventor: Bo Karlsson, Eskilstuna, Sweden

[73] Assignee: Volvo Wheel Loaders AB, Eskilstuna, Sweden

[21] Appl. No.: 09/142,362

[22] PCT Filed: Mar. 4, 1997

[86] PCT No.: PCT/SE97/00369
§ 371 Date: Sep. 29, 1998
§ 102(e) Date: Sep. 29, 1998

[87] PCT Pub. No.: WO97/32769
PCT Pub. Date: Sep. 12, 1997

[30] Foreign Application Priority Data

Mar. 4, 1996 [SE] Sweden .................................. 9600839

[51] Int. Cl.[7] ............................................. B60T 8/34
[52] U.S. Cl. ..................................... 303/113.2; 303/122.1
[58] Field of Search .......................... 303/122.09, 122.1, 303/122.12, 122.13, 122.14, 113.2, 9.63, 10, 11, 122.05

[56] References Cited

U.S. PATENT DOCUMENTS 4,726,629  2/1988  Resch ................................... 303/122.1
5,054,860  10/1991  Nomura et al. ....................... 303/122.1
5,221,125  6/1993  Okochi et al. ............................ 303/10
5,547,264  8/1996  Tozu et al. .............................. 303/9.62
5,695,260  12/1997  Tanaka et al. ...................... 303/122.12
5,733,017  3/1998  Nakashima et al. ....................... 303/10

FOREIGN PATENT DOCUMENTS 2 420 169  11/1974  Germany .
28 29 203  1/1980  Germany .
376 204  5/1975  Sweden .

*Primary Examiner*—Robert J. Oberleitner
*Assistant Examiner*—Melanie Talavera
*Attorney, Agent, or Firm*—Young & Thompson

[57] ABSTRACT

A hydraulic vehicle brake system, especially for wheeled vehicles, in which a triggered alarm for excessively low pressure in a brake circuit is maintained and where the alarm can be reset first after a pressure sensor coordinated with the brake circuit downstream of the brake valve unit, registers a pressure in the circuit which exceeds a predetermined minimum pressure level.

6 Claims, 6 Drawing Sheets

HYDRAULIC VEHICLE BRAKE SYSTEM

BACKGROUND OF THE INVENTION

The present invention relates to a hydraulic vehicle brake system, comprising a pump-fed hydraulic pressure accumulator unit for selective feeding of a hydraulic pressure medium to at least one brake circuit via an operable brake valve unit and a first pressure sensor which is arranged, when the pressure in a pressure accumulator unit is below a predetermined pressure level, to activate a warning unit for sending an alarm.

DESCRIPTION OF THE RELATED ART

In a known hydraulic vehicle brake system of the above mentioned type for construction machinery (see FIG. 1 in the accompanying drawings) a pressure sensor 1 for an accumulator unit provides a signal to a warning unit 3 as long as the sensor senses that the pressure is too low in the pressure accumulator unit 2, when the starter switch is turned on. If there should be a leak in the brake circuit 5 downstream of the foot-operated brake valve 6, the pressure in the accumulator 2 will again be built up to a level exceeding that at which the alarm is kept activated, when the brake valve closes after the pressure on the brake pedal is removed. i.e. the alarm will be deactivated despite the fact that there is still a defect in the brake circuit 5. In such a system, the alarm is reset (deactivated) automatically when there is once again sufficient pressure in the accumulator unit, and therefore there is a risk that an alarm which has been indicated will be forgotten without remedying the fault.

SUMMARY OF THE INVENTION

A main purpose of the present invention is to achieve a hydraulic vehicle brake system which improves the functioning and security of a fault monitoring arrangement for such a brake system, in which an alarm once triggered will be maintained and where the maintained alarm can normally first be reset after the pressure in the brake circuit even downstream of the brake valve is above a predetermined minimum level.

For this purpose, the brake system described by way of introduction according to the invention is characterized in that with the warning unit there is coordinated means for maintaining a triggered alarm, and that there is coordinated with the brake circuit downstream of the brake valve unit a second pressure sensor, which is arranged to be activated to reset the warning unit first when a minimum pressure level has been exceeded in the brake circuit downstream, of the brake valve unit. A triggered alarm is thereby maintained until the second sensor indicates that there is sufficiently high pressure in the brake circuit downstream of the brake valve unit, the second sensor being adapted to reset the warning unit. Temporary shut-off of the warning unit can, if so desired, normally be done by breaking the voltage to the starter switch of the vehicle.

It is suitable to apply the principle according to the invention to a brake system with two brake circuits, of which at least with one of the brake circuits, but preferably with both, there is coordinated a second pressure sensor in the brake circuit portion downstream of the brake valve unit for resetting the warning unit when a predetermined minimum pressure level has been exceeded.

The second alarm-resetting pressure sensors can be coupled in series or in parallel with each other. In the latter case, it is possible to determine which of the brake circuit portions located downstream of the brake valve unit is defective.

The means for maintaining a triggered alarm can comprise a relay or be integrated into a control computer which in turn controls the warning unit, which can comprise a visual and/or acoustic alarm and possibly provide text information on a driver display.

The alarm-resetting pressure sensor can be a pressure monitor which is disposed to break or close an electric circuit at a predetermined pressure in a the brake circuit downstream of the brake valve unit. If the alarm-resetting pressure sensors are analog pressure sensors, they are disposed to continuously feed a signal corresponding to the current brake circuit pressure value to the control computer, which is disposed, after determining that there is a predetermined maximum pressure difference between the brake circuits downstream of the brake valve unit, to activate the warning unit, the pressure sensors being disposed to reset the alarm via the control computer when the pressure level in the respective brake circuits exceeds a predetermined value at the same time as the value of the pressure difference is less than the predetermined maximum value.

BRIEF DESCRIPTION OF THE DRAWINGS

The invention will be described in more detail below with reference to the accompanying drawings of which.

DESCRIPTION OF THE PREFERRED EMBODIMENTS

Figure 1:
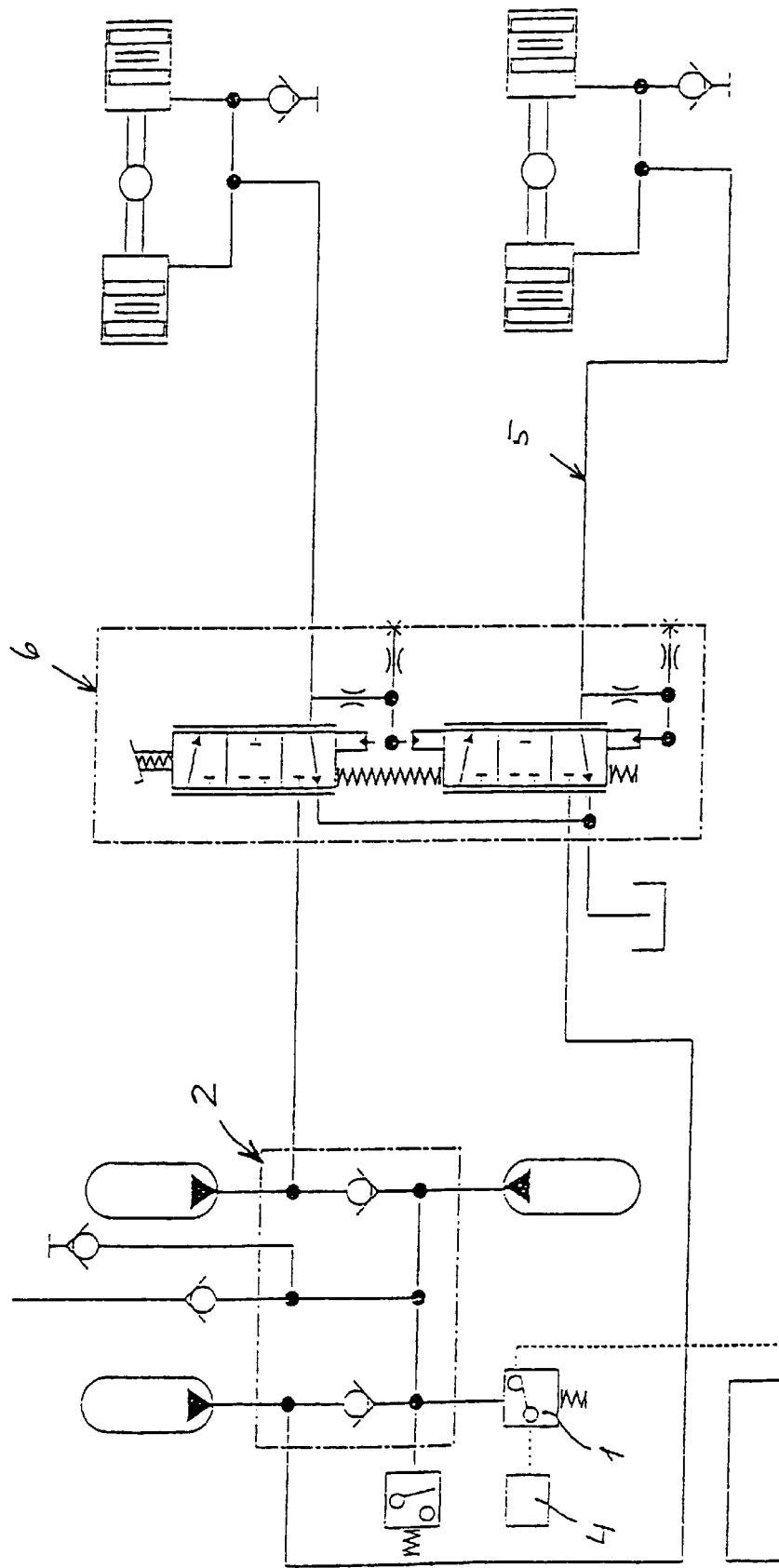
FIG. 1 shows a circuit diagram of a previously known hydraulic vehicle brake system.
Figure 2:
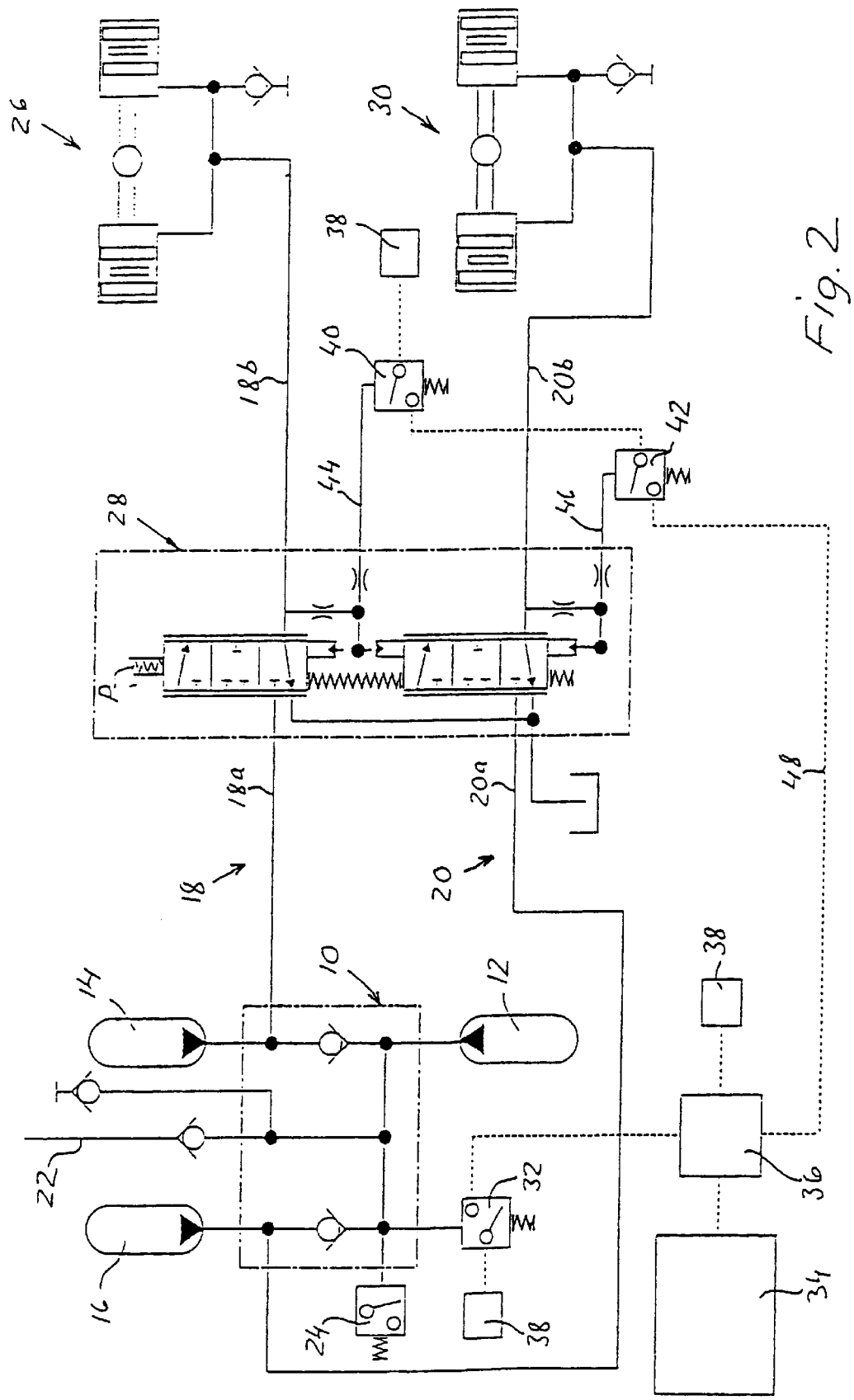
FIG. 2 shows a circuit diagram of a hydraulic vehicle brake system according to a first embodiment of the present invention.

With reference to the drawings and in particular to FIG. 2, a first embodiment of the hydraulic brake system according to the invention comprises a hydraulic pressure accumulator unit 10, which has a primary pressure accumulator 12 and two secondary pressure accumulators 14,16, the latter each being coordinated with an individual brake circuit 18 and 20, respectively. The accumulators 12,14,16 are fed and charged with pressure oil from a pump (not shown) via a feeder line 22. A pressure monitor 24 is disposed in a known manner to activate the oil pump, when the pressure in the accumulator 12 drops below a predetermined level, e.g. 120 bar, and shuts off the pump at reaching a charge of e.g. 150 bar.

The pressure accumulator 14 feeds pressure fluid to the brake cylinders of the wheels at the front wheel axle 26 of the vehicle, for example, via a foot pedal-operated brake valve unit 28 of a double-slide design which is known per se, while the pressure accumulator 16 feeds pressure fluid to the brake cylinders of the wheels at a rear wheel axle 30 of the vehicle via the brake valve unit 28.

With the accumulator unit 10 there is also coordinated a pressure monitor 32, which is arranged to be activated, i.e.

close (alternatively break) an electric circuit, for example, to a warning unit 34 via a maintaining relay 36 when the pressure in the accumulator 12 goes below a predetermined minimum value, e.g. 90 bar. The warning unit 34 can consist of a visual and/or acoustic alarm means, possibly in combination with text information on a driver display. 38 designates a current supply means, e.g. a starting switch.

The brake circuits 18, 20, respectively, each have a respective circuit portion 18a, 20a, respectively, located upstream of the brake valve unit 28 and a circuit portion 18b, 20b located downstream of the brake valve unit 28. Each downstream portion 18b, 20b, respectively, of the brake circuits has an individual pressure monitor 40, 42, respectively, e.g. an analog pressure sensor, which is arranged via a connection 44 and 46, respectively, to sense a predetermined minimum pressure level of e.g. 45 bar in the respective downstream portions 18b, 20b of the brake circuits 18, 20, in order to be activated. In the embodiment shown in FIG. 2, the pressure monitors 40,42 are coupled in series with each other and are supplied with current via the starting switch 38. The pressure monitor 42 is connected via a line 48 to the relay 36.

The hydraulic vehicle brake system according to the invention with alarm function when the brake fluid pressure is too low in either of the brake circuits. functions in the following manner:

In normal operation when the brake circuit portions 18a, 18b as well as 20a, 20b are intact, the accumulator unit 10 operates within, for example, the mentioned pressure interval of 120–150 bar while being monitored by the pressure monitor 24, which controls the fluid pump (not shown). The pressure monitor 32 for the alarm function is thus inactive; i.e. in the embodiment shown the electrical circuit to the warning unit 34 and the relay 36 is broken. If leakage should occur in either of the brake circuits 18 or 20, for example, in the brake circuit portion 20a upstream of the brake valve unit 28, the operating pressure in the accumulator unit 10 drops below said minimum value of 90 bar for the pressure monitor 32 so that it is activated and maintains so for activating the warning unit 34. The alarm triggered by the pressure monitor 32 is maintained until the leakage has been repaired and the pressure in the two brake circuits as a whole has been reestablished to a level exceeding 90 bar, but the alarm can be shut off temporarily during this period by breaking the voltage via the starting switch 38. Even if the vehicle is started without having repaired this leak, the alarm will again be activated. If the leakage in the brake circuit portion 20a has been taken care of, the alarm will be maintained until the pressure monitors 40,42 for the two brake circuit portions 18b and 20b downstream of the brake valve unit 28 have determined that there is sufficient minimum pressure (e.g. at least 45 bar) in these brake circuit portions as well, which can be checked by depressing the brake pedal P in order to open the two slides in the valve unit 28, whereupon—if there is sufficient pressure—these pressure monitors 40,42 will be closed and send a reset signal to the relay 36. If the pressure monitor 32 also senses a sufficient minimum pressure in the accumulator unit 10, the relay 36 and the warming unit 34 will be reset.

If there should occur a leakage in one of the brake circuit portions 18b, 20b (e.g. in the circuit portion 20b) downstream of the brake valve unit 28, the pressure in the accumulator 12 will drop below the minimum pressure of 90 bar when the brake valve unit 8 is opened, whereupon the pressure monitor 32 activates the relay 36 and triggers the warning unit 34. As soon as the driver releases the pressure on the brake pedal P, the pressure will again be built up in the accumulator unit 10 to a level which causes the pressure monitor 32 to break the electrical circuit to the relay 36, but the alarm will be maintained in any case, since no alarm-resetting signal from the pressure monitor 42 can be obtained before the leakage has been remedied so that the pressure in the brake circuit portion 20b can again exceed the minimum value of 45 bar. It is first then that the pressure monitor 42 (and the pressure monitor 40) can close the electrical circuit to the relay 36 to restore it and deactivate the alarm from the warning unit 34. By an alarm-resetting brake system constructed in this manner it is possible to make sure that a driver can not unintentionally drive away in a restarted vehicle, either with a previously triggered leakage alarm or with a new leakage. A check must first be made that there is sufficient pressure in the brake circuits 18, 20, which can be achieved by the driver pressing the brake pedal P after start, whereupon the pressure monitors 32,40, 42 register whether there is the required minimum pressure in the brake circuits 18, 20. Preferably, the alarm unit is arranged to always be activated automatically at each vehicle start, which means that the driver must always step on the brake pedal to cancel the warning, i.e. in order to receive confirmation via the pressure monitor that sufficient pressure can be generated by the brake cylinders to achieve the required retardation of the vehicle. This means that an obligatory brake test must be made at each start, which can provide an indication of all types of brake faults, and even reveal if a foreign object is blocking or impeding the depression of the brake pedal.

The principle for activation of the pressure monitors 32,40,42 can of course be reversed. i.e. they can instead of closing electrical circuit when sufficiently high pressure is sensed, break the circuit, which in certain cases can be an advantage, such as when there is a fault in the current supply to the electrical circuit.

Figure 3:
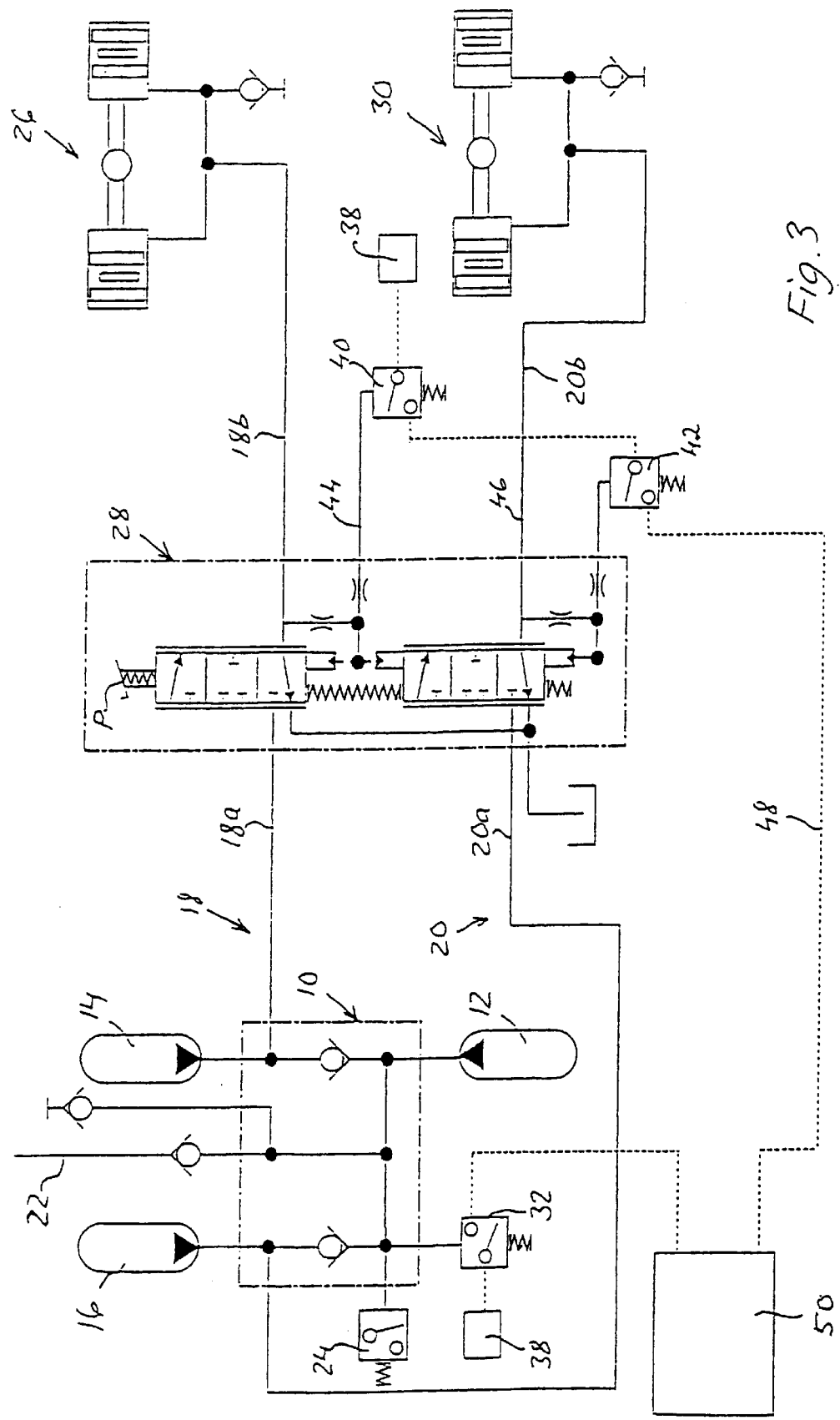
FIG. 3 shows a circuit diagram of a hydraulic vehicle brake system according to a second embodiment of the present invention.

FIG. 3 shows an alternative embodiment of the vehicle brake system according to the present invention, which differs from that in FIG. 2 only in that the maintenance function of the relay 36 has now been integrated into a control computer 50, which is programmed to process signals from the pressure monitors 32,40,42 to activate, when required, a warning unit (not shown in more detail here) in accordance with set conditions.

Figure 4:
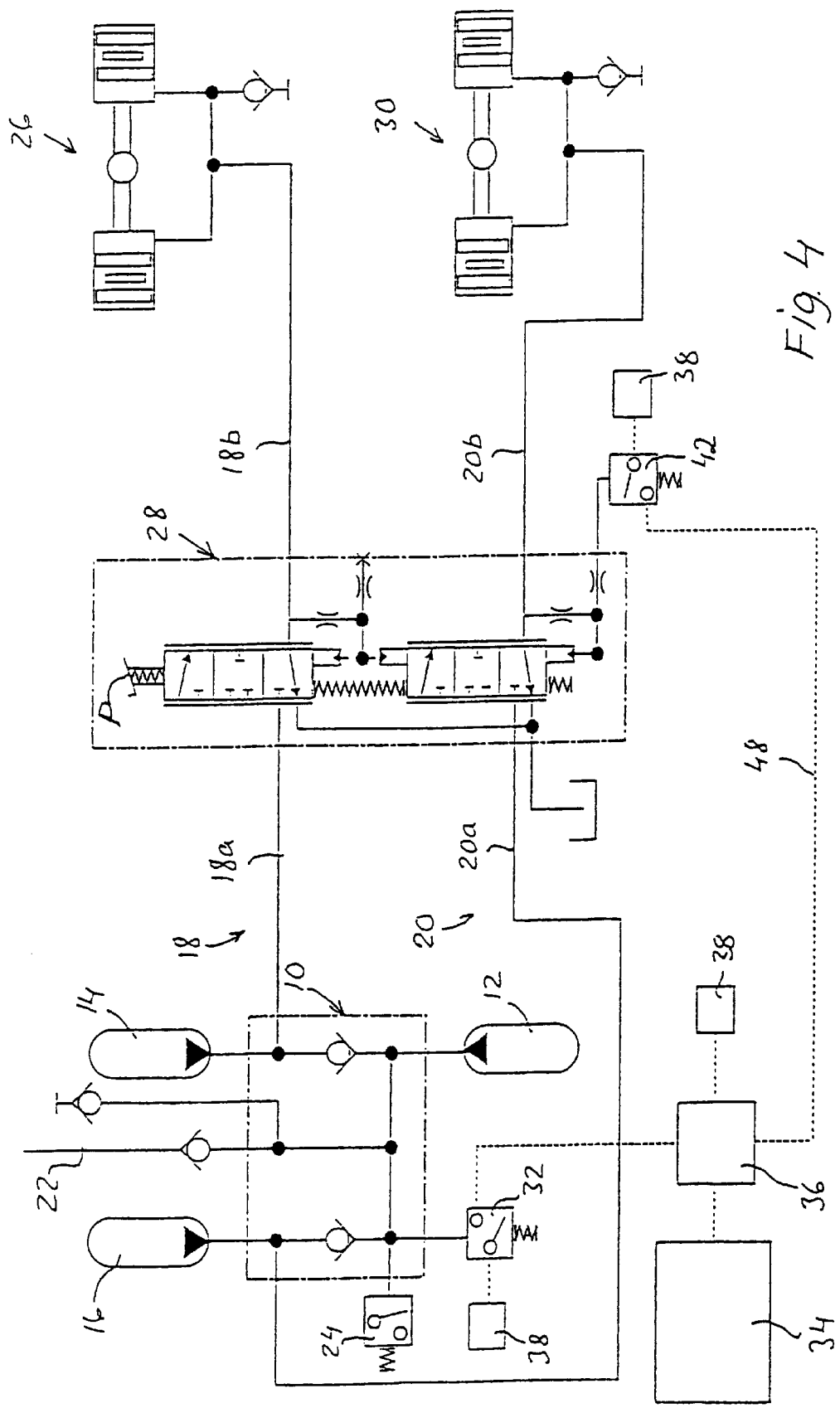
FIG. 4 shows a circuit diagram of a hydraulic vehicle brake system according to a third embodiment of the present invention.

An additional embodiment of the vehicle brake system according to the invention is shown in FIG. 4, which differs from the embodiment shown in FIG. 2 only in that one brake circuit portion 20b, downstream of the brake valve unit 28 is provided with a pressure monitor 42; i.e. the pressure monitor 40 for the brake circuit portion 18b has been eliminated. Despite this, it is possible with the pressure monitors 32 and 42 in combination to determine if there is leakage in the brake circuit portion 18b without a pressure monitor. If the pressure monitor 42 is activated upon depression of the brake pedal P; i.e. there is sufficient pressure in the brake circuit portion 20b to provide a reset signal to the relay 36, the pressure monitor 32 will still maintain the alarm, since the pressure in the brake circuit 18a, 18b will be too low due to the leakage.

Figure 5:
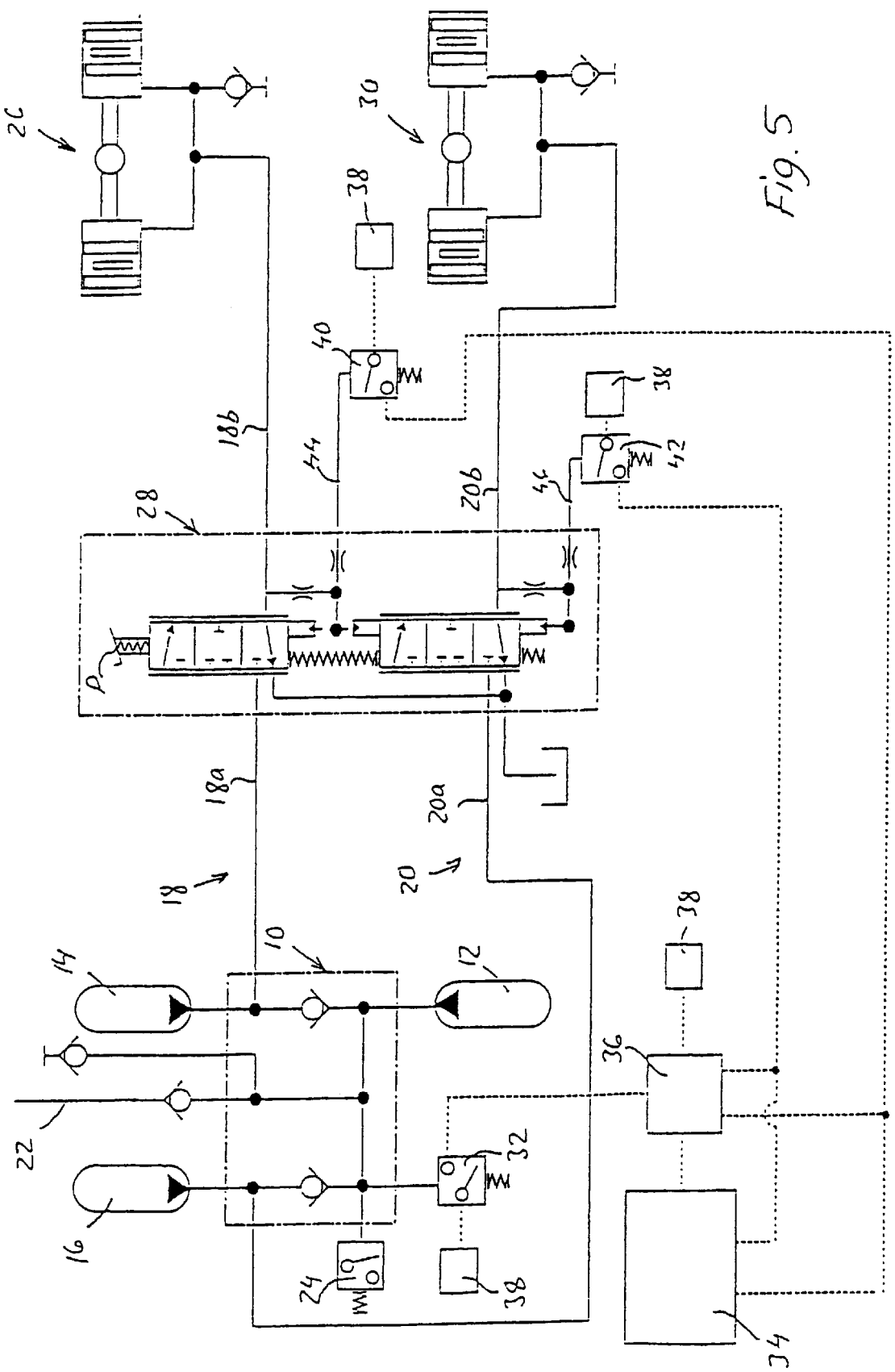
FIG. 5 shows a circuit diagram of a hydraulic vehicle brake system according to a fourth embodiment of the present invention.

FIG. 5 shows still another embodiment of the vehicle brake system according to the present invention, which in all essential respects corresponds to that in FIG. 2, but where the pressure monitors 40,42 for the brake circuit portions 18b, 20b downstream of the brake valve unit 28 are instead coupled in parallel to each other, making it possible to determine which of the brake circuit portions 18b, 20b is defective. This is not possible if the pressure monitors are coupled in series (FIG. 2). When sufficiently high pressure is registered by the pressure monitors 40,42, they are activated for sending reset signals to the relay 36, which in turn deactivates the alarm from the warning unit 34. A control computer coordinated with the latter can in this case determine and indicate to the driver and service personnel which brake circuit portion is defective.

Figure 6:
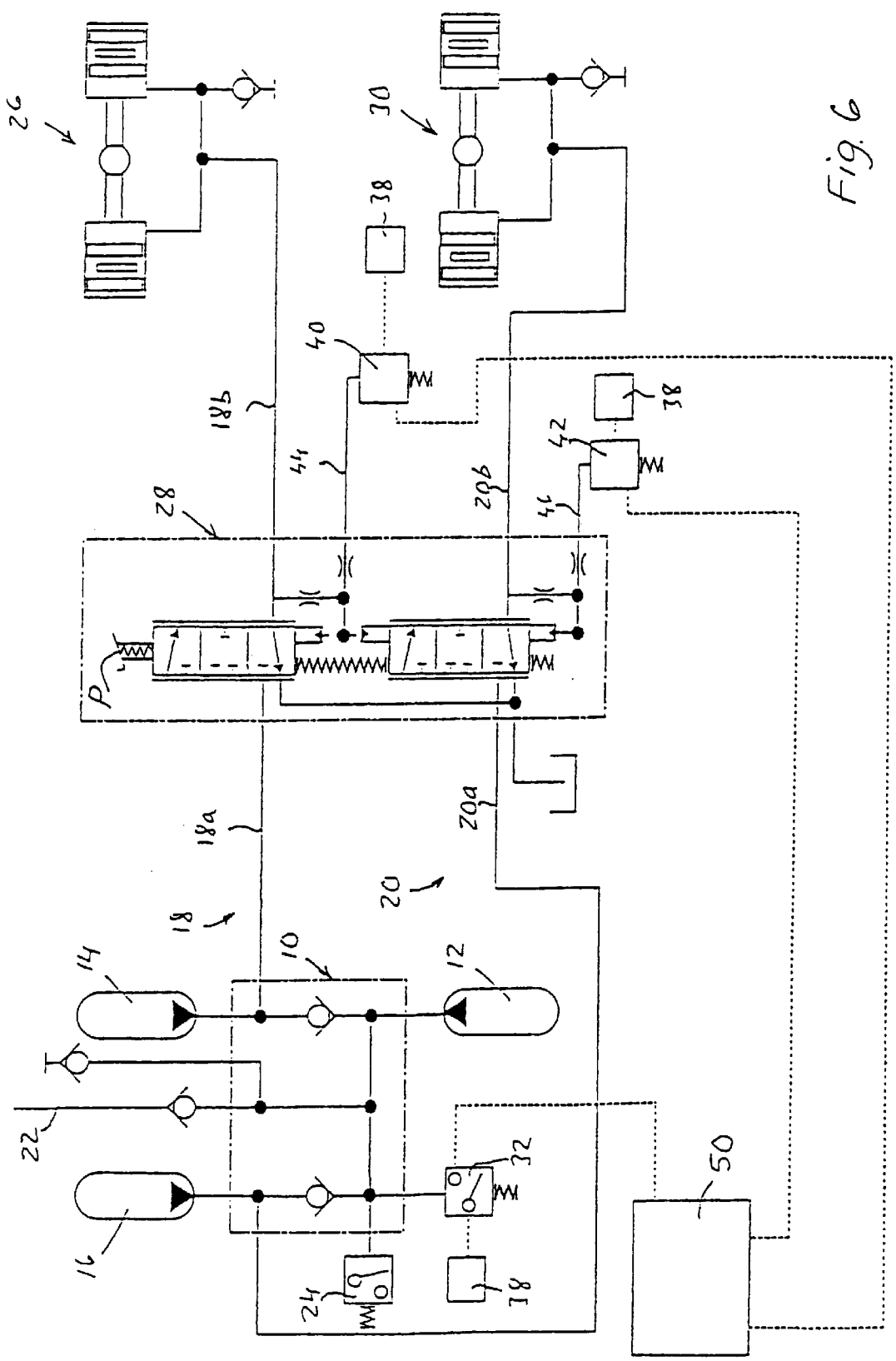
FIG. 6 shows a sixth embodiment of a hydraulic vehicle brake system according to the present invention.

Finally, FIG. 6 shows a hydraulic vehicle brake system similar to that shown in FIG. 5. The pressure monitors 40,42 coupled in parallel consist of two analog sensors; the pressure level sensed thereby can be read by a control computer 50 which is disposed to activate an alarm if the difference between the pressure levels exceeds a certain value. Resetting the alarm (the warning unit) is done in a similar manner to that described for the preceding embodiments; i.e. when the pressure level in the respective brake circuits exceeds a predetermined level at the same time as the value of the pressure difference is less than the predetermined maximum allowable value.

What is claimed is:

1. Hydraulic vehicle brake system, comprising:

a pump-fed hydraulic pressure accumulator unit (10) for selective feeding of a hydraulic pressure medium to at least one brake circuit (18,20) via an operable brake valve unit (28), a first pressure sensor (32) which is arranged, when the pressure in the pressure accumulator unit (10) is below a predetermined pressure level, to activate a warning unit (34) for triggering an alarm, a means (36;50) coordinated with said warning unit for maintaining a triggered alarm therein, and a second pressure sensor (40,42) coordinated with a brake circuit section (18b,20b) downstream of the brake valve unit (28), said second pressure sensor being arranged to deactivate the triggered warning unit (34) first when a minimum pressure level has been exceeded in the brake circuit section downstream of the brake valve unit (28) when operating the latter to an open position.

2. Hydraulic vehicle brake system comprising:

two brake circuits (18,20), a pump-fed hydraulic pressure accumulator unit (10) for selective feeding of a hydraulic pressure medium to said brake circuits via an operable brake valve unit (28), a first pressure sensor (32) which is arranged, when the pressure in the pressure accumulator unit (10) is below a predetermined pressure level, to activate a warning unit (34) for triggering an alarm, a means (36;50) coordinated with said warning unit for maintaining a triggered alarm therein, and a second alarm-deactivating pressure sensor (40,42) coordinated with at least one of two brake circuit sections (18b,20b) downstream of the brake valve unit (28), said second alarm-deactivating pressure sensor being arranged to deactivate the triggered warning unit (34) first when a minimum pressure level has been exceeded in the respective brake circuit sections downstream of the brake valve unit (28) when operating the latter to an open position.

3. Hydraulic vehicle brake system according to claim 2, further comprising two of said second alarm-deactivating pressure sensors, and wherein one of said two second alarm-deactivating pressure sensors (40,42) is coordinated with each of the brake circuit sections (18b,20b) downstream of the brake valve unit.

4. Hydraulic vehicle brake system according to claim 3, wherein the two second alarm deactivating pressure sensors (40,42) are coupled in series to each other.

5. Hydraulic vehicle brake system according to claim 3, wherein the two second alarm deactivating pressure sensors (40,42) are coupled in parallel to each other.

6. Hydraulic vehicle brake system according to claim 2, wherein said means for maintaining a triggered alarm in the warning unit is integrated in a control computer (50), said second alarm-deactivating pressure sensor (40,42) being an analog pressure sensor, arranged to continuously feed a signal corresponding to the current brake circuit section pressure value to the control computer (50) which is adapted, after establishment of a predetermined maximum pressure difference between the brake circuit sections (18b, 20b) downstream of the brake valve unit (28), to activate the warning unit (34), the second alarm-deactivating pressure sensor (40,42) being disposed to deactivate the alarm via the control computer (50) when the pressure level in the respective brake circuit sections exceeds a predetermined value at the same time as the value of the pressure difference is less than the predetermined maximum value.

* * * * *